(12) United States Patent
Koreeda et al.

(10) Patent No.: US 10,754,090 B2
(45) Date of Patent: Aug. 25, 2020

(54) OPTICAL FIBER CABLE ASSEMBLY AND MEASUREMENT DEVICE

(71) Applicant: JAPAN AVIATION ELECTRONICS INDUSTRY, LIMITED, Tokyo (JP)

(72) Inventors: Yuichi Koreeda, Tokyo (JP); Hideto Shimazu, Tokyo (JP); Masaki Ishiguro, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/532,742

(22) PCT Filed: Dec. 1, 2015

(86) PCT No.: PCT/JP2015/083759
§ 371 (c)(1),
(2) Date: Jun. 2, 2017

(87) PCT Pub. No.: WO2016/147494
PCT Pub. Date: Sep. 22, 2016

(65) Prior Publication Data
US 2017/0357050 A1    Dec. 14, 2017

(30) Foreign Application Priority Data

Mar. 18, 2015  (JP) .................................. 2015-054809

(51) Int. Cl.
*G02B 6/42* (2006.01)
*G02B 6/06* (2006.01)
(Continued)

(52) U.S. Cl.
CPC ................. *G02B 6/06* (2013.01); *G02B 6/38* (2013.01); *G02B 6/3839* (2013.01);
(Continued)

(58) Field of Classification Search
CPC ...... G02B 6/06; G02B 6/4214; G02B 6/4224; G02B 6/4225; G02B 6/4415
See application file for complete search history.

(56) References Cited

U.S. PATENT DOCUMENTS 4,737,010 A * 4/1988 Le Maitre ............ G02B 6/3885
                                                      385/134
6,351,590 B1 * 2/2002 Shahid ................. G02B 6/3608
                                                      385/114
(Continued)

FOREIGN PATENT DOCUMENTS

CN      101091132      12/2007
CN      102057309       5/2011
(Continued)

OTHER PUBLICATIONS

Office Action issued in Japan Counterpart Patent Appl. No. 2015-054809, dated Feb. 2, 2016, along with an English translation thereof.

(Continued)

*Primary Examiner* — Thomas A Hollweg
*Assistant Examiner* — Mary A El Shammaa
(74) *Attorney, Agent, or Firm* — Greenblum & Bernstein, P.L.C.

(57) ABSTRACT

A plurality of optical fiber groups are housed in an optical fiber cable and which of the optical fiber groups optical fibers, which constitute the optical fiber groups, belong to can be identified depending on a covering of the optical fibers. Each of optical connectors (plug, receptacle) which are respectively attached to both ends of the optical fiber cable has regions, in which insertion holes in which the optical fibers are inserted and fixed one by one are formed to be arranged in a predetermined interval, in the same number as the number of the optical fiber groups, and even though the optical fibers in one optical fiber group are (Continued)

inserted and fixed in the insertion holes in an identical region, an arrangement order of the optical fibers in the region of the optical connector provided on one end is not maintained as an arrangement order of the optical fibers in the region of the optical connector provided on the other end.

7 Claims, 8 Drawing Sheets

(51) Int. Cl.
    *G02B 6/38*         (2006.01)
    *G02B 6/40*         (2006.01)
    *G02B 6/44*         (2006.01)

(52) U.S. Cl.
    CPC ......... *G02B 6/3855* (2013.01); *G02B 6/3862* (2013.01); *G02B 6/3882* (2013.01); *G02B 6/3885* (2013.01); *G02B 6/40* (2013.01); *G02B 6/4225* (2013.01); *G02B 6/44* (2013.01); *G02B 6/4403* (2013.01); *G02B 6/4415* (2013.01); *G02B 6/4471* (2013.01)

(56) References Cited

U.S. PATENT DOCUMENTS

| | | | | |
|---|---|---|---|---|
| 6,442,318 | B1* | 8/2002 | Goldman | G02B 6/3833 |
| | | | | 385/114 |
| 6,464,404 | B1* | 10/2002 | Robinson | G02B 6/04 |
| | | | | 385/137 |
| 6,707,972 | B1* | 3/2004 | Larkin | G02B 6/4415 |
| | | | | 385/106 |
| 2003/0016924 | A1* | 1/2003 | Thompson | G02B 6/4482 |
| | | | | 385/114 |
| 2003/0053772 | A1* | 3/2003 | Ikunishi | G02B 6/3608 |
| | | | | 385/114 |
| 2004/0042731 | A1* | 3/2004 | Hall | G02B 6/3865 |
| | | | | 385/59 |
| 2006/0093278 | A1 | 5/2006 | Elkins, II et al. | |
| 2010/0195955 | A1 | 8/2010 | Burnham et al. | |
| 2011/0110635 | A1 | 5/2011 | Toge et al. | |
| 2012/0106906 | A1 | 5/2012 | Sakabe et al. | |
| 2013/0156385 | A1* | 6/2013 | Ishigami | G02B 6/4268 |
| | | | | 385/92 |
| 2014/0079365 | A1* | 3/2014 | Hill | G02B 6/4455 |
| | | | | 385/135 |
| 2014/0369657 | A1* | 12/2014 | Hurley | G02B 6/4246 |
| | | | | 385/114 |
| 2015/0016772 | A1* | 1/2015 | Arao | G02B 6/4273 |
| | | | | 385/14 |

FOREIGN PATENT DOCUMENTS

| | | |
|---|---|---|
| CN | 102369468 | 3/2012 |
| CN | 102472877 | 5/2012 |
| CN | 103635844 A | 3/2014 |
| JP | 2001-264597 | 9/2001 |
| JP | 2003-202473 | 7/2003 |
| JP | 2014-122959 | 7/2014 |
| WO | 2013/186879 | 12/2013 |

OTHER PUBLICATIONS

Search Report issued in WIPO Patent Application No. PCT/JP2015/083759, dated Feb. 9, 2016.

Office Action issued in China Counterpart Patent Appl. No. 201580076182.3, dated Feb. 15, 2019, along with an English translation thereof.

Office Action issued in China Counterpart Patent Appl. No. 201580076182.3, dated Oct. 12, 2019, along with an English translation thereof.

* cited by examiner

OPTICAL FIBER CABLE ASSEMBLY AND MEASUREMENT DEVICE

TECHNICAL FIELD

The present invention relates to an optical fiber cable assembly in which optical connectors are respectively attached to both ends of an optical fiber cable and a measurement device using the optical fiber cable assembly.

BACKGROUND ART

A bundle fiber obtained by bundling a large number of optical fibers effectively has a large core area, being able to make a large quantity of light incident or transmit a large quantity of light. Accordingly, bundle fibers are used in various fields such as an industrial field, a medical field, and a field of analysis.

Examples of a bundle fiber include not only a light transmitting bundle fiber and a light receiving bundle fiber which transmit light merely in one direction but also a transmitting-receiving bundle fiber which transmits light in both directions. Compared to the use of an independent light transmitting bundle fiber and an independent light receiving bundle fiber, easier installation and a smaller installation space are required advantageously in the use of a transmitting-receiving bundle fiber.

The length of a bundle fiber is determined in accordance with the application thereof, and approximately 10 in of length of bundle fiber is sometimes required depending on the application. Such long bundle fiber exhibits such problem that handling thereof is complicated and the whole bundle fiber has to be exchanged when a damage or a failure occurs.

In order to avoid such problem, such method is conceivable that a bundle fiber is separated into some parts and used in a connected manner, for example, but positioning of respectively-corresponding optical fibers is impossible in connection of those bundle fibers, so that large increase of optical connection loss is undeniable.

It is necessary to use an optical connector which enables positioning of each optical fiber so as to connect optical fibers to each other with low loss, and an optical signal connection member which includes such optical connectors on both ends thereof is described in Patent Literature 1.

Figure 1A:
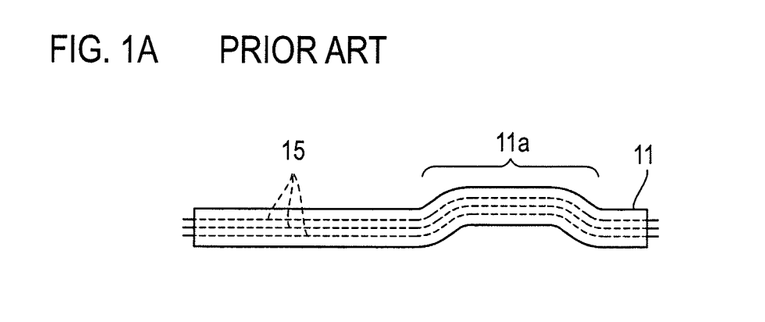
FIG. 1A is a plan view illustrating a first optical fiber sheet in a conventional optical signal connection member.
Figure 1B:
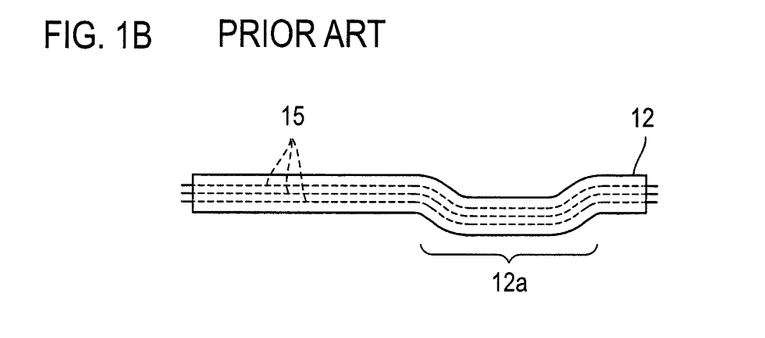
FIG. 1B is a plan view illustrating a second optical fiber sheet in the conventional optical signal connection member.
Figure 1C:
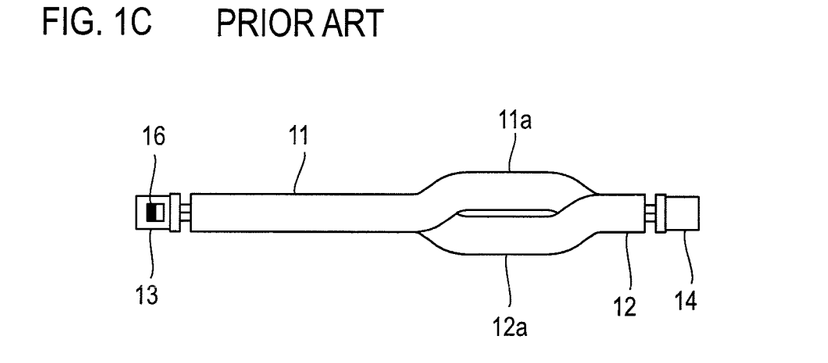
FIG. 1C is a plan view illustrating the conventional optical signal connection member.

FIGS. 1A to 1C illustrate an aspect of the optical signal connection member described in Patent Literature 1. As illustrated in FIG. 1C, this optical signal connection member is composed of a first optical fiber sheet 11, a second optical fiber sheet 12, and a first connector 13 and a second connector 14 which are respectively attached to one ends and the other ends of the first optical fiber sheet 11 and the second optical fiber sheet 12. FIGS. 1A and 1B respectively illustrate the configuration of the first optical fiber sheet 11 and the configuration of the second optical fiber sheet 12, and 15 in FIGS. 1A and 1B denotes optical fibers. The first optical fiber sheet 11 and the second optical fiber sheet 12 respectively include curve parts 11a and 12a and directions of the curve of the curve parts 11a and 12a are opposite to each other.

On the left side of FIG. 1C, the first optical fiber sheet 11 and the second optical fiber sheet 12 are disposed so that the first optical fiber sheet 11 is laminated on the second optical fiber sheet 12 and the optical fibers 15 protruding from each end portion are inserted to be attached into holes of a ferrule of the first connector 13. A window 16 is seen on the upper surface of the first connector 13.

On the other hand, on the right side of FIG. 1C, the second optical fiber sheet 12 is positioned on the first optical fiber sheet 11 and thus, the lamination order is different from that of the left side of FIG. 1C. The optical fibers 15 protruding from each end portion are attached to the second connector 14 in a similar manner to the first connector 13. A window of the second connector 14 is positioned on the lower side.

The optical signal connection member having the configuration as the one described above is used as a relay cable between two bundle fibers, for example, and connectors to be respectively connected with the first connector 13 and the second connector 14 are attached to connection ends of each bundle fiber, being able to realize separate bundle fibers without increase of optical connection loss and without the use of a single long bundle fiber. Here, the arrangements of the optical fibers 15 are same as each other when the tip end surfaces are observed in a manner that the connectors 13 and 14 provided on both ends are positioned so that their surfaces having the windows 16 face the upper side, in the optical signal connection member illustrated in FIG. 1C.

PRIOR ART LITERATURE

Patent Literature

Patent Literature 1: Japanese Patent Application Laid Open No. 2014-122959

SUMMARY OF THE INVENTION

Problems to be Solved by the Invention

However, the above-described optical signal connection member has directionality in bending characteristics thereof due to the use of the optical fiber sheets 11 and 12, causing a problem that the optical signal connection member cannot be bent in an arbitrary direction to result in difficulty in use thereof. Further, processing itself of optical fibers having large cores into an optical fiber sheet is difficult, thus causing another problem that optical fibers having large cores cannot be used.

An object of the present invention is to provide an optical fiber cable assembly which does not have directionality in bending characteristics, does not generate any problem even with optical fibers having large cores, and is favorably used as a relay cable between bundle fibers, for example, and to provide a measurement device which uses the optical fiber cable assembly.

Means to Solve the Problems

According to the present invention, in an optical fiber cable assembly configured such that optical connectors are respectively attached to both ends of an optical fiber cable, a plurality of optical fiber groups are housed in the optical fiber cable, which of the optical fiber groups optical fibers, which constitute the optical fiber groups, belong to can be identified depending on a covering of the optical fibers, each of the optical connectors has regions, in which insertion holes in which the optical fibers are inserted and fixed one by one are formed to be arranged in a predetermined interval, in a same number as a number of the optical fiber groups, and even though the optical fibers in one optical fiber group are inserted and fixed in the insertion holes in an identical region, an arrangement order of the optical fibers in the region of the optical connector provided on one end is not maintained as an arrangement order of the optical fibers in the region of the optical connector provided on the other end.

According to the present invention, a measurement device which irradiates a measurement object with light so as to measure light from the measurement object includes the optical fiber cable assembly according to the present invention, in which the number of the optical fiber groups is set to two where one optical fiber group serves as a transmission path and the other optical fiber group serves as a reception path, a first bundle fiber which includes an optical connector, which is connected with the optical connector provided on the one end of the optical fiber cable assembly, on one end thereof to be connected with the optical fiber cable assembly and the other end of which is branched into two, a second bundle fiber which includes an optical connector, which is connected with the optical connector provided on the other end of the optical fiber cable assembly, on one end thereof to be connected with the optical fiber cable assembly and the other end of which is opposed to the measurement object, a light source which makes light incident on one branch end of the first bundle fiber, and a light receiving element which receives light from the measurement object, the light being outputted from the other branch end of the first bundle fiber.

Effects of the Invention

According to the present invention, an optical fiber cable assembly can be provided which does not have directionality in bending characteristics to exhibit superior usability on the point and is favorably used as a relay cable between bundle fibers, for example.

Since it is sufficient to insert and fix optical fibers, which constitute an optical fiber group, into arbitrary insertion holes in a predetermined region while merely identifying an optical fiber group to which the optical fibers belong by coverings thereof without considering an arrangement order of the optical fibers, the optical fiber cable assembly can be easily assembled.

Further, according to the present invention, the measurement device is easily handled compared to the configuration in which a single long bundle fiber is used.

DETAILED DESCRIPTION OF THE EMBODIMENT

An embodiment of the present invention will be described below.

Figure 2:
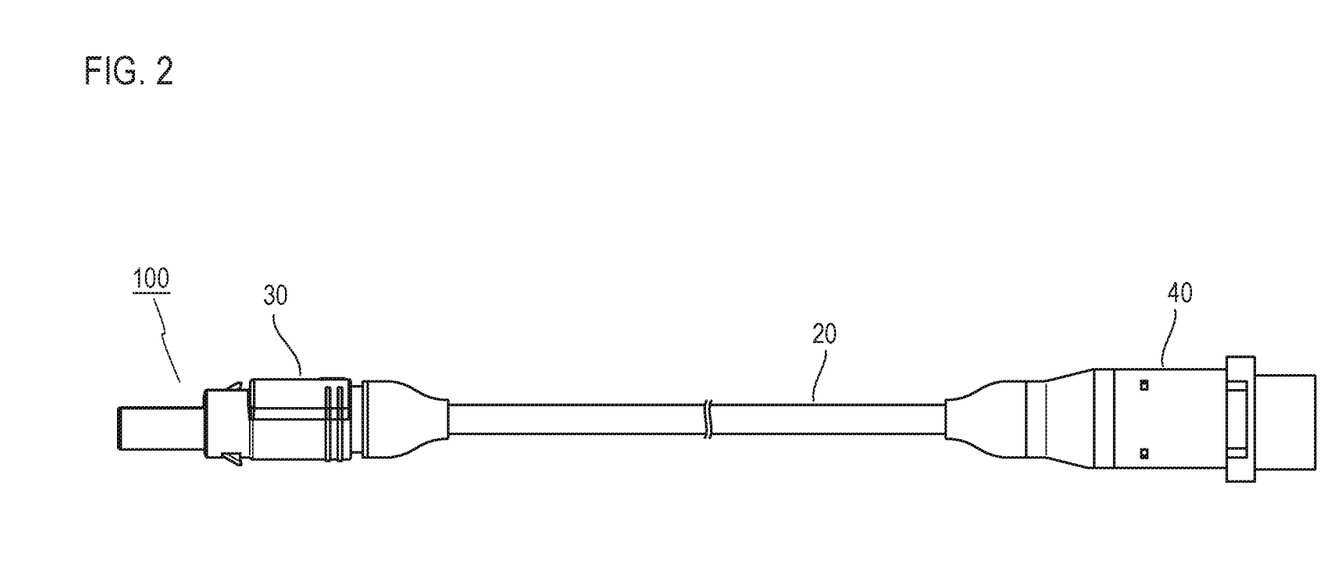
FIG. 2 is a front elevational view illustrating an optical fiber cable assembly according to one embodiment of the present invention.

FIG. 2 illustrates an optical fiber cable assembly according to one embodiment of the present invention. An optical fiber cable assembly 100 is configured such that optical connectors are attached to both ends of an optical fiber cable 20. In this example, the optical connector on one end of the optical fiber cable 20 is a plug 30 and the optical connector on the other end is a receptacle 40.

Figure 3A:
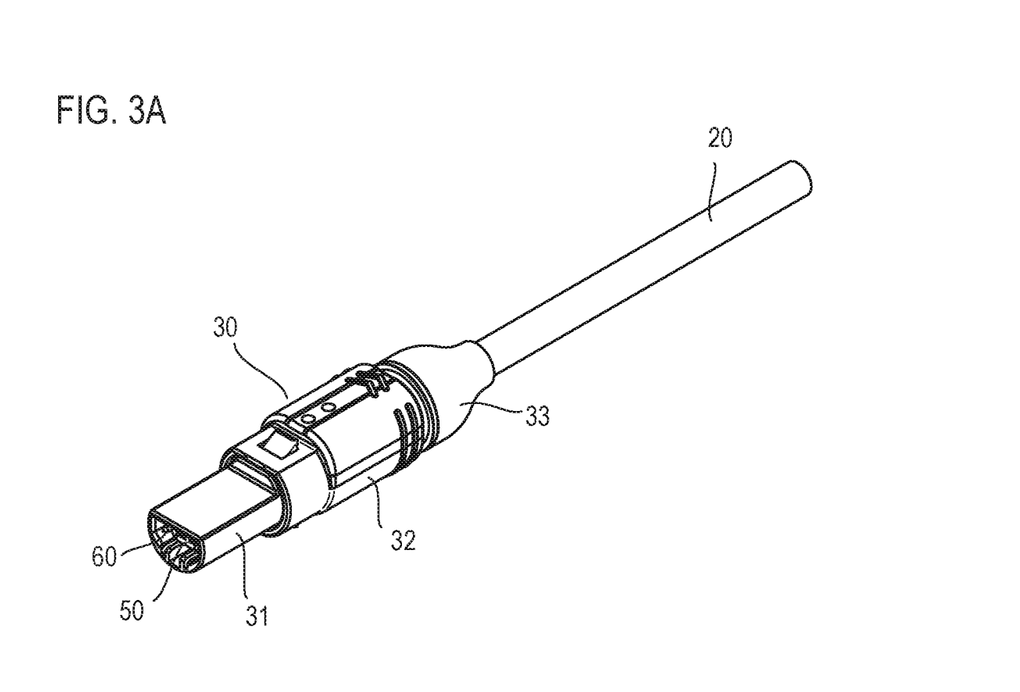
FIG. 3A is a perspective view of a plug in FIG. 2.

FIGS. 3A and 3B and FIGS. 4A and 4B respectively illustrate details of the plug 30 and details of the receptacle 40. In FIG. 3A, 31 denotes a plug body, 32 denotes a coupling nut, and 33 denotes a boot. Further, in FIG. 4A, 41 denotes a shell, 42 denotes a rear insulator, and 43 denotes a boot. A ferrule 50 is housed in the plug body 31 and a ferrule 50 same as that in the plug body 31 is housed also in the shell 41.

Figure 5A:
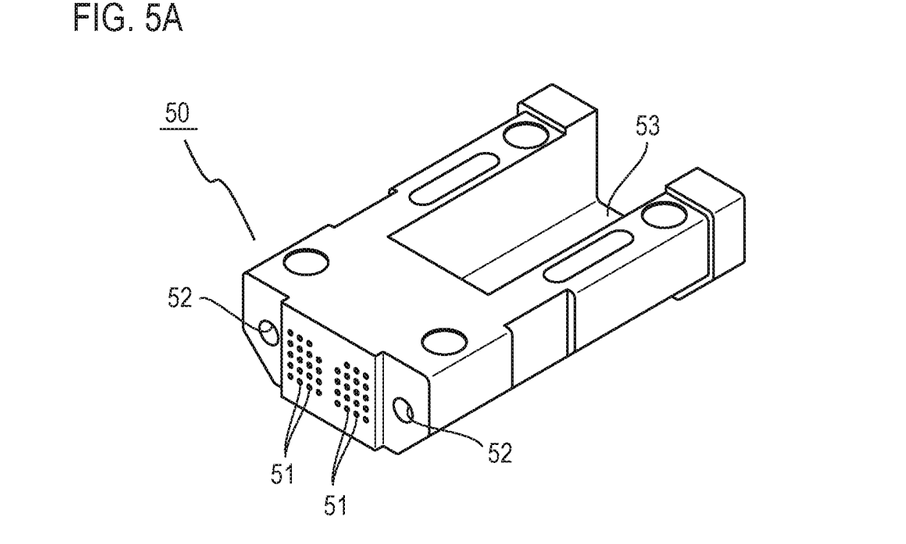
FIG. 5A is a perspective view of a ferrule in FIGS. 3B and 4B.
Figure 5B:
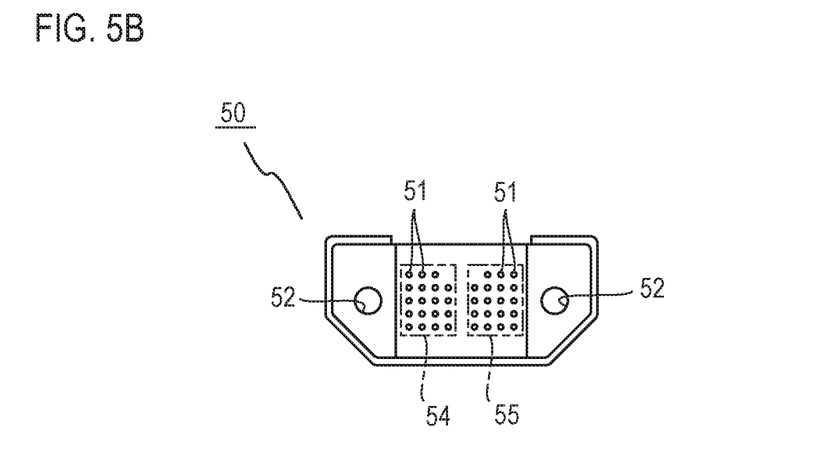
FIG. 5B is a front elevational view of the ferrule illustrated in FIG. 5A.

FIGS. 5A and 5B illustrate details of the ferrule 50. In FIGS. 5A and 5B, 51 denotes insertion holes into which optical fibers are inserted to be fixed one by one and 52 denotes a guide hole. Further, 53 denotes a recessed portion in which terminals of optical fibers are housed. The insertion holes 51 are formed separately in two regions 54 and 55 in this example and 19 insertion holes 51 are formed to be arranged in a predetermined interval in each of the regions 54 and 55.

Figure 3B:
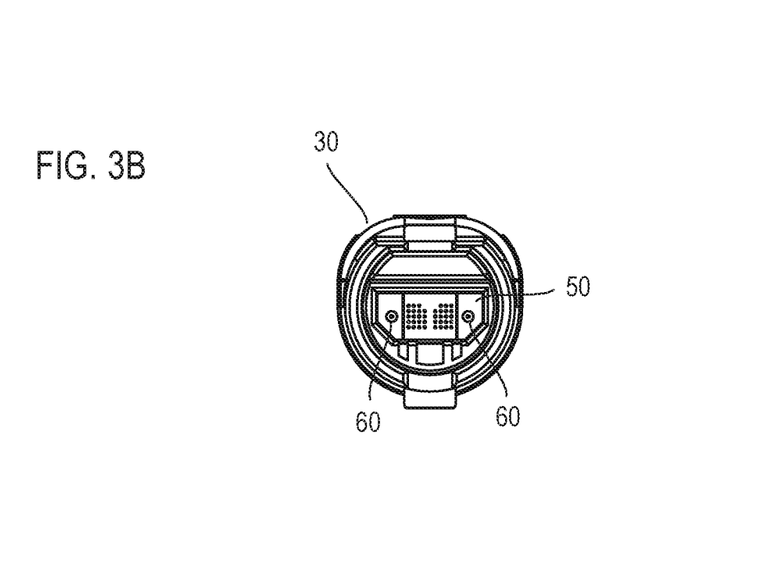
FIG. 3B is a front elevational view of the plug illustrated in FIG. 3A.
Figure 4A:
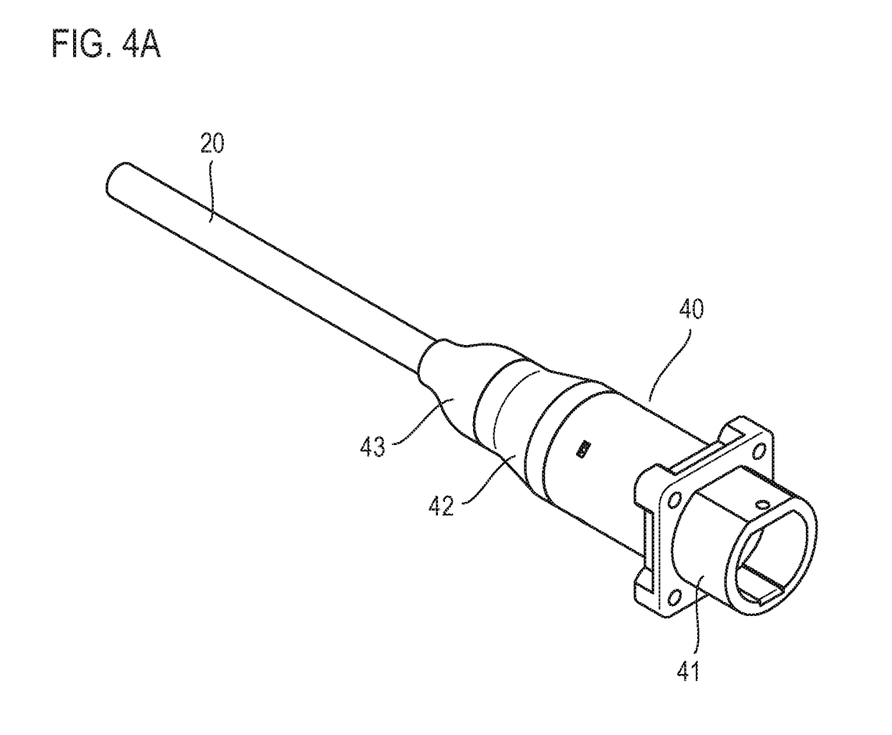
FIG. 4A is a perspective view of a receptacle in FIG. 2.
Figure 4B:
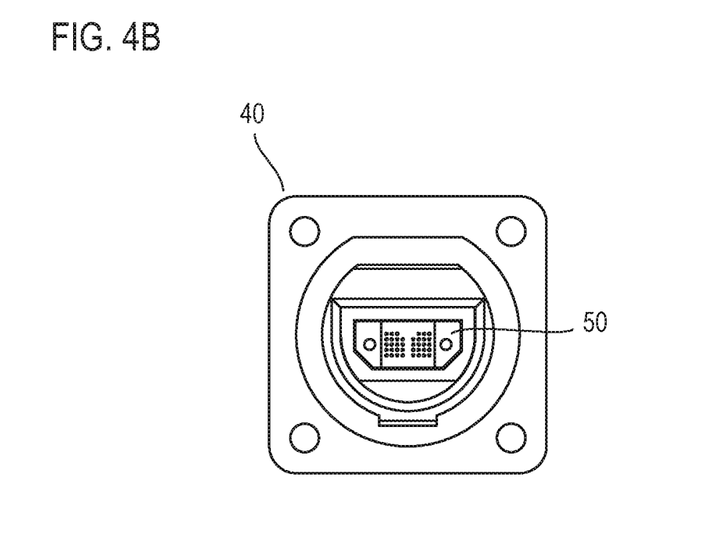
FIG. 4B is a front elevational view of the receptacle illustrated in FIG. 4A.

Two guide holes 52 are formed so that the regions 54 and 55 are positioned between these two guide holes 52, and guide pins 60 are respectively inserted to be arranged in the guide holes 52 of the ferrule 50 housed in the plug body 31, as illustrated in FIGS. 3A and 3B. The guide pins 60 are protruded by a predetermined amount from a tip end surface of the ferrule 50.

Though detailed illustration is omitted, two optical fiber groups whose number is same as that of the regions 54 and 55 of the ferrule 50 and which are composed of 19 optical fibers are housed in the optical fiber cable 20. The optical fibers are housed in an exterior covering of the optical fiber cable 20 in a respectively-independent state, without being arrayed and fixed collectively in each optical fiber group or without being arrayed and fixed collectively in each group of several optical fibers, for example. Each optical fiber is independently covered and an optical fiber group to which an optical fiber belongs can be identified by difference of colors of coverings of optical fibers constituting the two optical fiber groups.

Figure 6:
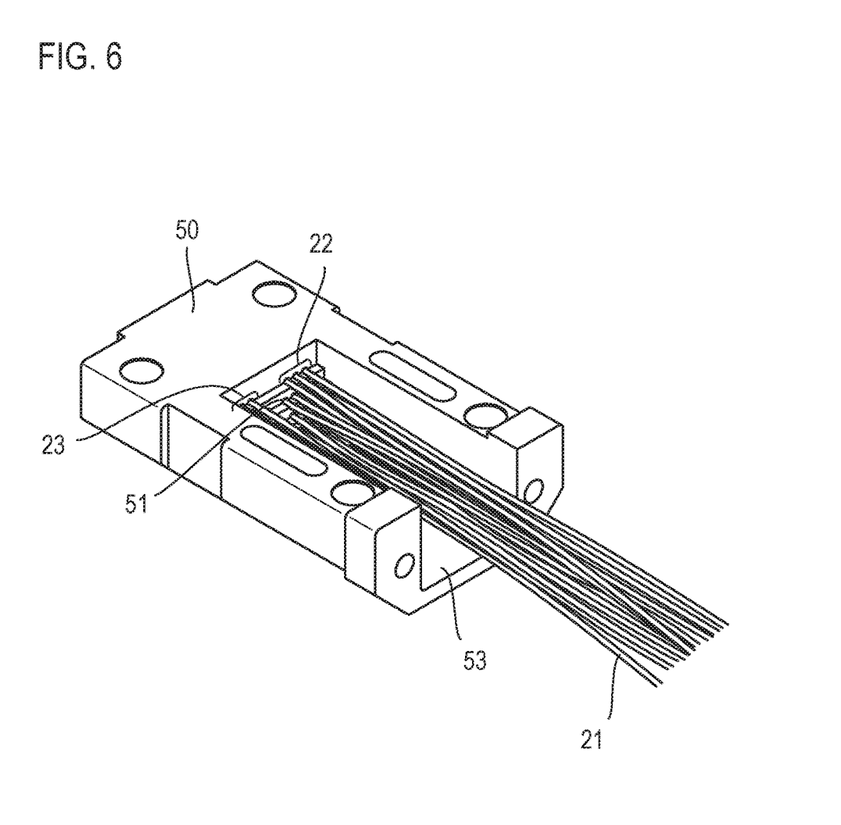
FIG. 6 is a perspective view illustrating a state in which optical fiber groups are attached to the ferrule.

FIG. 6 illustrates a state in which the optical fibers 21 of the two optical fiber groups taken out from the optical fiber cable 20 are inserted and fixed to be connected in the insertion holes 51 of the ferrule 50. The optical fibers 21 of a first optical fiber group 22 are inserted and fixed in the insertion holes 51 of the region 54 (see FIG. 5B) and the optical fibers 21 of a second optical fiber group 23 are inserted and fixed in the insertion holes 51 of the region 55 (see FIG. 5B). As respects insertion and fixation of the optical fibers 21 into the insertion holes 51, it is sufficient that the optical fibers 21 in one optical fiber group are inserted and fixed in the insertion holes 51 in an identical region, and an arrangement order of each of the optical fibers 21 does not matter.

As respects respective attachment of the optical fibers 21 of the first optical fiber group 22 and the optical fibers 21 of the second optical fiber group 23 with respect to the ferrule 50 of the plug 30 and the ferrule 50 of the receptacle 40, it is sufficient that the optical fibers 21 in one optical fiber group are inserted and fixed in the insertion holes 51 in an identical region as mentioned above. Accordingly, an arrangement order of the optical fibers 21 in the regions 54 and 55 of the ferrule 50 of the plug 30 is not maintained as an arrangement order of the optical fibers 21 in the regions 54 and 55 of the ferrule 50 of the receptacle 40. Since it is sufficient to insert and fix the optical fibers 21 into the insertion holes 51 while merely identifying an optical fiber group to which the optical fibers 21 belong by colors of their coverings without considering an arrangement order, assembling work can be easily performed.

Figure 7A:
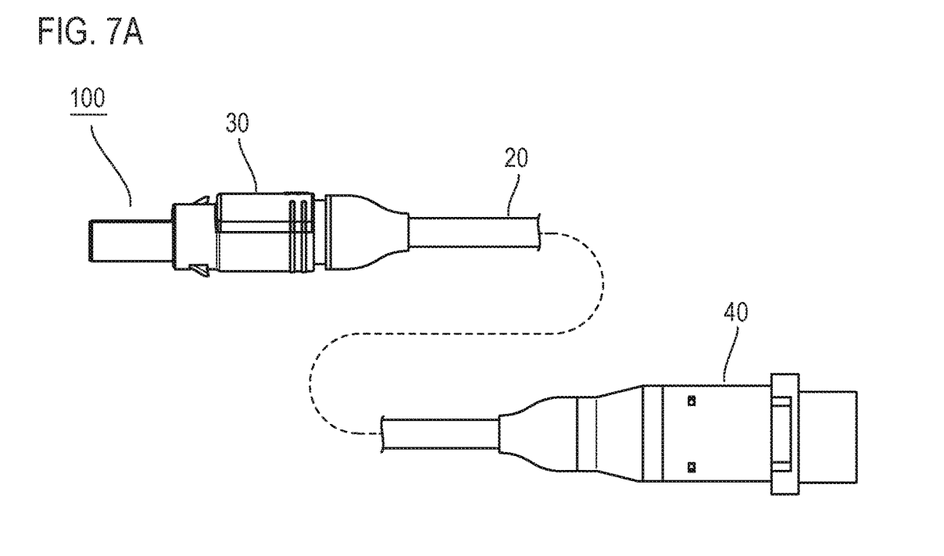
FIG. 7A is a front elevational view illustrating the optical fiber cable assembly according to one embodiment of the present invention.
Figure 7B:
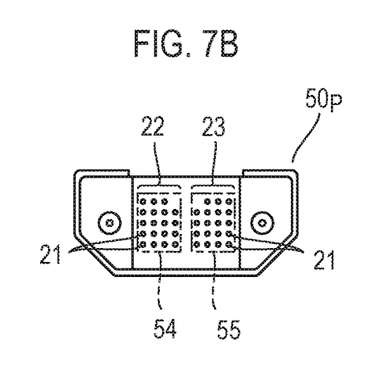
FIG. 7B is a front elevational view of a ferrule in a plug in FIG. 7A.
Figure 7C:
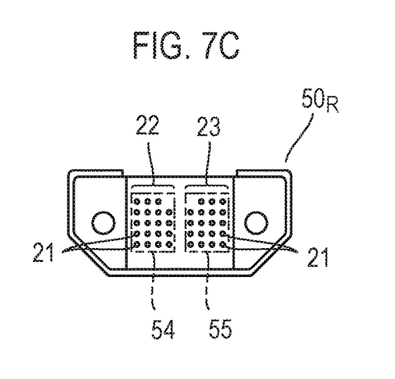
FIG. 7C is a front elevational view of a ferrule in a receptacle in FIG. 7A.
Figure 7D:
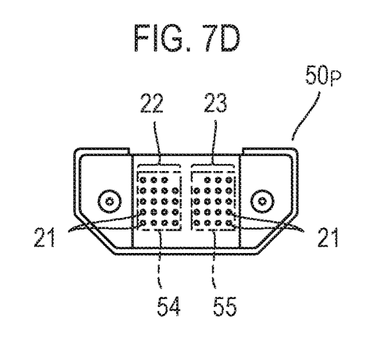
FIG. 7D is a front elevational view of the ferrule in the plug in FIG. 7A.
Figure 7E:
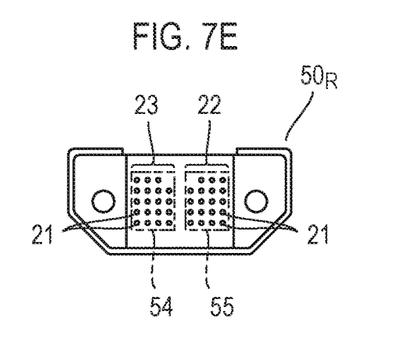
FIG. 7E is a front elevational view of the ferrule in the receptacle in which an arrangement of optical fiber groups is changed from that of FIG. 7C.

FIGS. 7B to 7E illustrate two ways of arrangement of the first and second optical fiber groups 22 and 23 with respect to two regions 54 and 55 of the ferrule 50, and FIG. 7A illustrates the optical fiber cable assembly 100 in a similar manner to FIG. 2. FIGS. 7B and 7D illustrate the ferrule 50 in the plug 30 when viewing the plug 30 from the tip end side (the connection end surface side of the optical fibers 21), and FIGS. 7C and 7E illustrate the ferrule 50 in the receptacle 40 when viewing the receptacle 40 from the tip end side (the connection end surface side of the optical fibers 21). Here, a ferrule in the plug 30 is referred to as a ferrule 50$_P$ and a ferrule in the receptacle 40 is referred to as a ferrule 50$_R$ in FIGS. 7B to 7E.

FIGS. 7B and 7C illustrate the case where arrangement orders of the first optical fiber group 22 and the second optical fiber group 23 in the ferrules 50$_P$ and 50$_R$ are accorded with each other when viewed from the connection end surface side of the optical fibers 21. That is, the first optical fiber group 22 is positioned in the region 54 and the second optical fiber group 23 is positioned in the region 55 in both of the ferrule 50$_P$ and the ferrule 50$_R$.

On the other hand, FIGS. 7D and 7E illustrate the case where the arrangement orders of the first optical fiber group 22 and the second optical fiber group 23 in the ferrules 50$_P$ and 50$_R$ are reversed to each other when viewed from the connection end surface side of the optical fibers 21. The first optical fiber group 22 is positioned in the region 54 in the ferrule 50$_P$ and is positioned in the region 55 in the ferrule 50$_R$. Accordingly, the second optical fiber group 23 is positioned in the region 55 in the ferrule 50$_P$ and is positioned in the region 54 in the ferrule 50$_R$.

Thus, there are two ways of arrangement (arrangement order) of the first and second optical fiber groups 22 and 23 with respect to the ferrules 50$_P$ and 50$_R$ and the arrangement way is selected depending on the application mode (connection configuration) of the optical fiber cable assembly 100.

Figure 8:
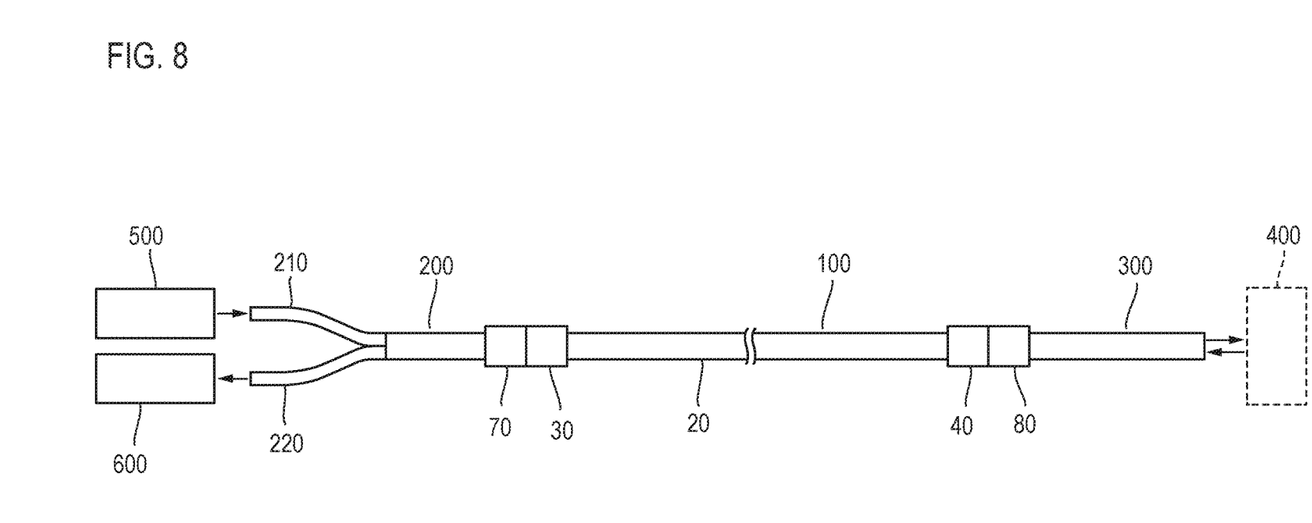
FIG. 8 is a diagram schematically illustrating a measurement device according to the present invention.

FIG. 8 schematically illustrates an example in which the optical fiber cable assembly 100 is used as a relay cable between transmitting-receiving bundle fibers in a measurement device which irradiates a measurement object with light and measures light from the measurement object, as a favorable application example of the optical fiber cable assembly 100 described above.

A first bundle fiber 200 includes a receptacle 70, on one end thereof, which serves as an optical connector to be connected with the plug 30 of the optical fiber cable assembly 100, and thus the first bundle fiber 200 is connected with the optical fiber cable assembly 100. The other end of the first bundle fiber 200 is branched into two. A second bundle fiber 300 includes a plug 80, on one end thereof, which serves as an optical connector to be connected with the receptacle 40 of the optical fiber cable assembly 100, and thus the second bundle fiber 300 is connected with the optical fiber cable assembly 100. The other end of the second bundle fiber 300 is opposed to a measurement object 400.

In FIG. 8, 500 denotes a light source and 600 denotes a light receiving element. As described above, the optical fiber cable assembly 100 includes two optical fiber groups which are the first optical fiber group 22 and the second optical fiber group 23. One of the two optical fiber groups 22 and 23 is used as a transmission path (light transmission path) and the other is used as a reception path (light reception path).

Light emitted from the light source 500 is made incident on an end surface of one branch portion 210 of the first bundle fiber 200. The incident light is transmitted through the first bundle fiber 200, the optical fiber cable assembly 100, and the second bundle fiber 300 and outputted from an end surface of the second bundle fiber 300 to be radiated to the measurement object 400.

Light obtained from the measurement object 400 by light irradiation (for example, reflected light, scattered light, emitted light, or the like) is incident on the end surface of the second bundle fiber 300 and is transmitted through the second bundle fiber 300, the optical fiber cable assembly 100, and the first bundle fiber 200 to be outputted from an end surface of the other branch portion 220 of the first bundle fiber 200. The light outputted from the end surface of the branch portion 220 is received by the light receiving element 600. Thus, light from the measurement object 400 can be detected to be measured.

A measurement device as the one illustrated in FIG. 8 is applicable to various fields such as an industrial field, a medical field, and a field of analysis. For example, as respects the medical field, this measurement device can be used for measurement of pulse waves of a human body.

If the optical fiber cable assembly 100 is used as a relay cable between the bundle fibers 200 and 300 as described above, a single long bundle fiber does not have to be used. Since the optical fiber cable assembly 100 is coupled with the bundle fibers 200 and 300 by optical connectors, disjunction is easy and handling is easy on this point. Further, even an occurrence of a damage or a failure can be handled only by partial exchange.

Further, since each of the optical fibers 21 in the optical fiber cable 20 is independent as described above, the optical fiber cable assembly 100 does not have directionality in bending characteristics. Thus, the optical fiber cable assembly 100 can be bent in an arbitrary direction, exhibiting superior usability.

The embodiment of the present invention has been described thus far. Since the optical fibers 21 constituting one optical fiber group are used for transmitting one type of light in the optical fiber cable assembly 100, it is not necessary to consider the individual arrangement order of the optical fibers 21. As long as the light amount of the whole optical fiber group is secured, the number of optical fibers 21 constituting the optical fiber group and the number of the insertion holes 51 of the ferrule 50 may be determined as appropriate.

It is preferable to use the optical fiber 21 with low transmission loss and low connection loss. On this point, it is preferable to use a hard-plastic clad fiber (H-PCF) having a core which is made of quartz glass and has a large diameter: 200 μm, as the optical fiber 21.

Whether the optical fibers 21 belong to the first optical fiber group 22 or the second optical fiber group 23 can be identified depending on difference in colors of the coverings of the optical fibers 21. However, not limited to this, identification may be performed depending on lines or marks put over the entire length of coverings having colors same as each other, for example. Identification may be performed depending on:

whether or not there is a line,
whether the number of lines is one or two,
whether or not there is a mark,
or the like, for example.

In the above-described example, the optical fiber cable assembly 100 includes the plug 30 on one end thereof and the receptacle 40 on the other end thereof. However, the optical fiber cable assembly 100 may be configured to include the plugs 30 on both ends thereof or include the receptacles 40 on both ends thereof. In the case where identical plugs 30 are provided on both ends or the case where identical receptacles 40 are provided on both ends, the optical fiber cable assembly does not have directionality when employing the arrangement of the first and second optical fiber groups 22 and 23 illustrated in FIGS. 7B and 7C.

Meanwhile, the configuration illustrated in FIG. 2 is employed and the arrangement of the first and second optical fiber groups 22 and 23 illustrated in FIGS. 7D and 7E is employed, enabling direct connection (short-circuit connection) between the bundle fibers 200 and 300 without the optical fiber cable assembly 100 in the application mode illustrated in FIG. 8, for example.

Each of the plug 30 and the receptacle 40 includes one ferrule 50. However, not a single ferrule 50, each of the plug 30 and the receptacle 40 may include two ferrules which are respectively provided in the regions 54 and 55, for example.

The number of optical fiber groups in the optical fiber cable 20 is not limited to two, but may be three or more, being determined depending on the application mode. The ferrule 50 is provided with regions for connecting optical fiber groups in the same number as the number of optical fiber groups.

What is claimed is:

1. An optical fiber cable assembly comprising:
an optical fiber cable;
optical fibers each having a predetermined covering; and
two optical connectors,
wherein
the two optical connectors are respectively attached to both ends of the optical fiber cable,
the optical fibers are housed in the optical fiber cable in a respectively-independent state, without being arrayed and fixed collectively in each group of several optical fibers,
the optical fibers are classified into optical fiber groups according to the predetermined covering, the predetermined covering of one of the optical fibers identifying one of the optical fiber groups, one of the two optical connectors has first regions corresponding to the optical fiber groups in a one-to-one manner and each of the first regions including insertion holes arranged in a predetermined interval,
another one of the two optical connectors has second regions corresponding to the optical fiber groups in a one-to-one manner and each of the second regions including insertion holes arranged in a predetermined interval,
one end of each of the optical fibers included in one of the optical fiber groups is inserted and fixed in one of the insertion holes within a corresponding one of the first regions, and
another end of each of the optical fibers included in one of the optical fiber groups is inserted and fixed in one of the insertion holes within a corresponding one of the second regions.

2. The optical fiber cable assembly according to claim 1, wherein an arrangement of the optical fiber groups in one of the two optical connectors when one of the two optical connectors is viewed from a one end surface side of the optical fibers is accorded with an arrangement of the optical fiber groups in the other one of the two optical connectors when the other one of the two optical connectors is viewed from another end surface side of the optical fibers.

3. The optical fiber cable assembly according to claim 1, wherein the two optical connectors each have a single ferrule, the first regions are delimited on the single ferrule included in one of the two optical connectors, and the second regions are delimited on the single ferrule included in the other one of the two optical connectors.

4. The optical fiber cable assembly according to claim 1, wherein the optical fibers are H-PCFs.

5. The optical fiber cable assembly according to claim 1, wherein a color of the predetermined covering represents one of the optical fiber groups.

6. The optical fiber cable assembly according to claim 1, wherein a number of the optical fiber groups is set to two, in which one optical fiber group serves as a transmission path and the other optical fiber group serves as a reception path.

7. A measurement device which irradiates a measurement object with light so as to measure light from the measurement object, the measurement device comprising:
the optical fiber cable assembly according to claim 6;
a first bundle fiber which includes an optical connector, the optical connector being connected with one of the two optical connectors, on one end thereof to be connected with the optical fiber cable assembly and the other end of which is branched into two;
a second bundle fiber which includes an optical connector, the optical connector being connected with the other one of the two optical connectors, on one end thereof to be connected with the optical fiber cable assembly and the other end of which is opposed to the measurement object;
a light source which makes light incident on one branch end of the first bundle fiber; and
a light receiving element which receives light from the measurement object, the light being outputted from the other branch end of the first bundle fiber.

\* \* \* \* \*